Patented June 27, 1933

1,915,273

UNITED STATES PATENT OFFICE

JOHN R. EOFF, JR., OF PIEDMONT, CALIFORNIA, ASSIGNOR TO VINIARDISTS, INC., A CORPORATION OF NEW YORK

PROCESS FOR REMOVING TARTARIC ACID AND TARTRATES FROM MUST, GRAPE JUICE, AND WINE

No Drawing.   Application filed September 20, 1930.   Serial No. 483,394.

This invention relates to an improved process for removing tartaric acid and tartrates from grape juice, must, wine and other products of grapes.

During the manufacture of wines from grapes or grape juices a number of fundamental changes occur, the principal one of which is the transformation of sugar into alcohol. The must resulting from the crushing of the grapes is ordinarily supersaturated with potassium acid tartrate, commonly known as cream tartar, which crystallizes from the solution during the process of fermentation. The amount of crystallization or precipitation of the tartrates from the must depends upon several factors such as time, agitation, temperature and the alcoholic concentration developed. Ordinarily, however, the precipitation is gradual and continues for a considerable length of time beyond the conclusion of the vinous fermentation of the solution. If the wine is bottled before the precipitation of tartrates is finally completed the product loses its commercial value for the reason that the bottles will ultimately contain certain of the tartrates in precipitated and visible form. Unfermented grape juices are also affected in the same manner by the continued precipitation of the tartrates therein, and it is ordinarily necessary for the manufacturer to allow them to be stored for a considerable length of time so as to permit the process of precipitation to be completed before bottling. Owing to the rather expensive carrying and overhead charges incident to the storage of the wines and grape juices for lengthy periods of time, many methods have been devised for bringing about a shortening of process of precipitation. None of the heretofore known methods employed by manufactures have been successful in reducing the time of precipitation and at the same time maintaining the quality of the product, except at relatively high cost and inconvenience.

My improved process for removing the tartrates from wines, grape juices and musts enables a manufacturer to satisfactorily bring about a speedy precipitation of the tartrates therein without in any manner sacrificing the quality of the product.

An object of my invention is to provide an improved process for causing the tartrates in wines, grape juices and musts to be quickly precipitated without sacrificing the quality of the product.

Another object of my invention is to provide an inexpensive and novel process for rapidly removing the tartaric acid and tartrates from grape juices, musts, wines and other products of grapes.

A still further object of my invention is to provide an improved process for treating a product of grapes whether it be fermented or unfermented, whereby any desired proportion of the tartrates therein may be satisfactorily and rapidly removed without deleteriously affecting the quality of the product.

My improved process comprises adding to the wine, grape juice or must to be treated, a suitable quantity of calcium salt of the kind which has no objectional anion but which does have the property of being more soluble in the solution being treated than is calcium tartrate. The cation of the added calcium salt combines with the anion of the tartaric acid normally present in the wine, grape juice or must, and causes the rapid precipitation of the tartaric acid in the form of an almost insoluble calcium tartrate. Although many non-alkaline calcium salts such as calcium lactate, calcium acid malate, acid calcium phosphate and others, may be satisfactorily employed in carrying out my process, I have found normal calcium malate ($C_4H_4O_5CaH_2O$) to be the most desirable in producing the intended results. Calcium malate, when employed to bring about the rapid precipitation of the tartaric acid in the solution being treated, causes the removed tartaric acid to be replaced by malic acid. Malic acid is a natural constituent of grapes, wines and musts, and often normally occurs in these products in greater proportion than other acids. Unlike many other chemical products, the addition of malic acid to the solution being treated will not impair its quality, taste, odor or other natural characteristics.

In carrying out my invention in connection with, say, grape must, the amount of tartaric acid contained therein is firstly determined by any standard method, after which a requisite amount of suitable calcium salt, such as normal calcium malate, necessary to precipitate the desired amount of tartaric acid, is added to the must. The solution is then stirred or agitated for a short while to properly dissolve the malate, after which fermentation is allowed to proceed. By the time the fermentation ceases, or shortly thereafter, the reaction and precipitation of the tartaric acid in the solution will have been satisfactorily completed. Any proportion or practically all of the tartaric acid present in the solution to be treated, may be satisfactorily removed by properly determining the amount of calcium malate to be added. Thus, assuming the must contains 0.6 per cent total tartaric acid and it is desired to reduce this amount to 0.2 per cent, which last named amount has been found safe for unfortified wines and champagnes, then according to the reacting weights:

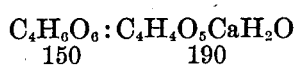
$$C_4H_6O_6 : C_4H_4O_5CaH_2O$$
$$150 \qquad 190$$

one hundred and fifty parts of tartaric acid require one hundred and ninety parts of mono-hydrated normal calcium malate for precipitation, or one part requires one and twenty seven one hundredths parts. Now 0.6 per cent minus 0.2 per cent equals 0.4 per cent, which is the amount of tartaric acid to be precipitated, and 0.4 multiplied by 1.27 equals approximately 0.5 per cent of calcium malate to be added to the must. These figures are based on the monohydrated normal calcium malate, but if the anhydrous salt is used, there will be a corresponding reduction in the required amount, in which case less calcium malate should be used, depending on the results desired.

I have found in carrying out my process in connection with comparatively young wine, that the best results can be accomplished by stirring or agitating the must for several hours after the calcium malate is added, after which the solution is allowed to stand for several days to insure complete separation of the calcium tartrate.

When unfermented grape juice is to be treated in accordance with my invention, care should be exercised to not extend the time of stirring or agitation to the point where fermentation commences.

In carrying out my improved process I have found that the amount of calcium salt required to accomplish the certain desired results, as well as the time required for stirring or agitation, varies with the different conditions, so for these and other apparent reasons I desire the limits of my invention to be governed by the appended claims rather than by the foregoing disclosure.

Having described my invention what I claim is:

1. A process for removing tartaric acid from grape juice, must or wine which comprises adding non-alkaline reacting normal calcium malate to the grape juice, must or wine.

2. A process for removing tartaric acid from grape juice, must or wine which comprises adding normal calcium malate to the grape juice, must or wine, and then agitating the mixture.

3. A process for removing tartaric acid from grape juice, must or wine which comprises adding calcium acid malate to the grape juice, must or wine.

4. A process for removing tartaric acid from grape juice, must or wine, which comprises adding calcium malate to the grape juice, must or wine, agitating the mixture for a definite period of time, and then allowing the mixture to stand.

5. In the process described, the step of causing a rapid precipitation of tartaric acid present in grape juice, must or wine and still retaining the natural acidity of the said grape juice, wine or must which comprises adding calcium acid malate to the solution, and then agitating the mixture.

In testimony whereof I have affixed my signature.

JOHN R. EOFF, Jr.